US011754778B2

(12) United States Patent
Westerhoff et al.

(10) Patent No.: US 11,754,778 B2
(45) Date of Patent: Sep. 12, 2023

(54) PHOTORESPONSIVE POLYMER COATED OPTICAL FIBERS FOR WATER TREATMENT

(71) Applicants: Paul K. Westerhoff, Scottsdale, AZ (US); Shahnawaz Sinha, Chandler, AZ (US); Juan Noveron, El Paso, TX (US)

(72) Inventors: Paul K. Westerhoff, Scottsdale, AZ (US); Shahnawaz Sinha, Chandler, AZ (US); Juan Noveron, El Paso, TX (US)

(73) Assignees: Arizona Board of Regents on behalf of Arizona State University, Scottsdale, AZ (US); Board of Regents; The University of Texas System, Austin, TX (US)

( * ) Notice: Subject to any disclaimer, the term of this patent is extended or adjusted under 35 U.S.C. 154(b) by 713 days.

(21) Appl. No.: 16/690,820

(22) Filed: Nov. 21, 2019

(65) Prior Publication Data

US 2020/0158948 A1    May 21, 2020

Related U.S. Application Data

(60) Provisional application No. 62/770,221, filed on Nov. 21, 2018.

(51) Int. Cl.
*G02B 6/02*      (2006.01)
*C02F 1/32*      (2023.01)
*C03C 25/106*   (2018.01)

(52) U.S. Cl.
CPC .......... *G02B 6/02395* (2013.01); *C02F 1/325* (2013.01); *C03C 25/106* (2013.01); *C02F 2201/3224* (2013.01)

(58) Field of Classification Search
CPC ...... C02F 1/32; C02F 1/78; C02F 1/48; C02F 1/72
See application file for complete search history.

(56) References Cited

U.S. PATENT DOCUMENTS

| 4,140,581 A | 2/1979 | Weetall |
| 5,637,877 A | 6/1997 | Sinofsky |

(Continued)

FOREIGN PATENT DOCUMENTS

| CN | 1612754 | 5/2005 | |
| ES | 2673673 A1 * | 6/2018 | ............... C02F 1/32 |

(Continued)

OTHER PUBLICATIONS

ES-2673673-A1 translation, Agabo Garcia C, ES (Year: 2018).*

(Continued)

*Primary Examiner* — Walter D. Griffin
*Assistant Examiner* — Cameron J Allen
(74) *Attorney, Agent, or Firm* — Fish & Richardson P.C.

(57) ABSTRACT

A photoreactor including a reservoir configured to hold water, the reservoir defining an inlet and an outlet, and a multiplicity of optical fiber assemblies positioned in the reservoir. Each optical fiber assembly includes one or more optical fibers coated with a composition comprising a photoresponsive polymer and a light source optically coupled to the one or more optical fibers. The photoresponsive polymer undergoes a change from an initial state to an irradiated state when irradiated with light from the light source, and photoresponsive polymer in the irradiated state is adapted to bind an ion from the water.

20 Claims, 10 Drawing Sheets

(56) References Cited

U.S. PATENT DOCUMENTS

| | | | |
|---|---|---|---|
| 5,875,384 | A | 2/1999 | Peill et al. |
| 5,905,837 | A | 5/1999 | Wang et al. |
| 6,347,172 | B1 | 2/2002 | Keller et al. |
| 6,418,252 | B1 | 7/2002 | Maitland |
| 6,501,893 | B1 | 12/2002 | Iimura |
| 7,566,157 | B2 | 7/2009 | Lo |
| 8,331,750 | B2 | 12/2012 | Deng et al. |
| 8,492,448 | B2 | 7/2013 | Dewa et al. |
| 8,929,703 | B2 | 1/2015 | Logunov et al. |
| 9,259,513 | B2 | 2/2016 | Bedwell et al. |
| 9,304,278 | B1 | 4/2016 | Bauco et al. |
| 9,618,672 | B2 | 4/2017 | Kuchinisky et al. |
| 9,751,785 | B2 | 9/2017 | Doudrick et al. |
| 9,878,320 | B2 | 1/2018 | Hristovski et al. |
| 10,092,356 | B2 | 10/2018 | Griffin et al. |
| 10,175,405 | B2 | 1/2019 | Logunov et al. |
| 10,427,194 | B2 | 10/2019 | Westerhoff et al. |
| 10,435,311 | B2 | 10/2019 | Hristovski et al. |
| 10,471,277 | B2 | 11/2019 | Rhodes et al. |
| 10,590,020 | B2 | 3/2020 | Apul et al. |
| 10,793,449 | B2 | 10/2020 | Westerhoff et al. |
| 2002/0054744 | A1 | 5/2002 | Vanpoulle et al. |
| 2005/0074216 | A1 | 4/2005 | Irie |
| 2007/0120522 | A1 | 5/2007 | Eickhoff |
| 2008/0019657 | A1 | 1/2008 | Maitland et al. |
| 2008/0308405 | A1 | 12/2008 | Yu et al. |
| 2010/0091516 | A1 | 4/2010 | Harle et al. |
| 2010/0233021 | A1 | 9/2010 | Sliwa et al. |
| 2011/0052926 | A1 | 3/2011 | Nakamura et al. |
| 2012/0228236 | A1 | 9/2012 | Hawkins |
| 2012/0321265 | A1 | 12/2012 | Terruzzi et al. |
| 2013/0175220 | A1 | 7/2013 | Hristovski et al. |
| 2014/0001036 | A1 | 1/2014 | Nakanishi et al. |
| 2014/0174905 | A1 | 6/2014 | Landry |
| 2014/0352801 | A1 | 12/2014 | McAlister |
| 2014/0374270 | A1 | 12/2014 | Minegishi et al. |
| 2015/0144802 | A1 | 5/2015 | Bauco et al. |
| 2016/0334311 | A1 | 11/2016 | Westerhoff et al. |
| 2017/0313601 | A1 | 11/2017 | Westerhoff et al. |
| 2018/0080148 | A1 | 3/2018 | Westerhoff et al. |
| 2018/0319677 | A1 | 11/2018 | Perreault et al. |
| 2019/0056363 | A1 | 2/2019 | Westerhoff et al. |
| 2019/0094118 | A1 | 3/2019 | Westerhoff et al. |
| 2019/0192879 | A1 | 6/2019 | Zaborsky |
| 2020/0031689 | A1 | 1/2020 | Hristovski et al. |
| 2021/0032130 | A1 | 2/2021 | Westerhoff et al. |
| 2021/0122667 | A1 | 4/2021 | Westerhoff et al. |
| 2022/0249719 | A1 | 8/2022 | Westerhoff et al. |

FOREIGN PATENT DOCUMENTS

| | | | |
|---|---|---|---|
| JP | 2007-130029 | | 5/2007 |
| KR | 100909102 B1 * | | 7/2009 |
| WO | WO 2002057686 | | 7/2002 |
| WO | WO 2009140025 | | 11/2009 |
| WO | WO 2014/121172 A2 | | 8/2014 |
| WO | WO 2014/159874 | | 10/2014 |
| WO | WO-2016197397 A1 * | 12/2016 | ............... B01J 20/26 |
| WO | WO 2018236812 | | 12/2018 |
| WO | WO 2020/072339 | | 4/2020 |
| WO | WO 2020072339 | | 4/2020 |

OTHER PUBLICATIONS

"Zonyl MP 1200: PTFE Additive," The Chemours Company, 2018, 2 pages.

Agc-chemicals [online], "Ultrafast plastic optical fiber Fontex" retrieved on Jan. 2, 2019, retrieved from URL, <https://www.agc-chemicals.com/jp/en/fluorine/products/detail/use/detail.html?uCode=JP-EN-F019_5>, 2 pages.

An et al., "Lower molecular weight fractions of PolyDADMAC coagulants disproportionately contribute to N-nitrosodimethylamine formation during water treatment," Water Research, Dec. 5, 2018, 150:466-472.

Arie et al., "Measurement and Analysis of Light Transmission through a Modified Cladding Optical Fiber with Applications to Sensors," Applied Optics, Jun. 1, 1986, 25(11):1754-1758.

Autin et al., "Evaluation of a UV-Light Emitting Diodes Unit for the Removal of Micropollutants in Water for Low Energy Advanced Oxidation Processes," Chemosphere, May 10, 2013, 92:745-751.

Ballato et al., "Silicon optical Fiber," Optics Express, Nov. 10, 2008, 16(23):18675-18683.

Beck et al., "Evaluating UV-C LED Disinfection Performance and Investigating Potential Dual-Wavelength Synergy," Water Research, Nov. 7, 2016, 109:207-216.

Biyarin et al., "Light-emitting optical fibers with controllable anomalous small-angle scattering," Journal of the Optical Society of America, Nov. 2017, 34(11):2396-2399.

Bogdanowicz et al., "Improved surface coverage of an optical fibre with nanocrystalline diamond by the application of dip-coating seeding," Diamond Related Materials, Mar. 7, 2015, 55:52-63.

Bolton et al., "Determination of the Quantum Yields of the Potassium Ferrioxalate and Potassium Iodide-Iodate Actinometers and a Method for the Calibration of Radiometer Detectors," Journal Photochemistry and Photobiology: A Chemical, Jun. 2, 2011, 222:166-169.

Bunge et al., "Rayleigh and Mie scattering in polymer optical fibers," Journal of Lightware Technology, Aug. 2006, 24(8):3137-3146.

Chen et al., "LED Revolution: Fundamentals and Prospects for UV Disinfection Applications," Environmental Science Water Research & Technology, 2017, 3(2):188-202.

Chew et al., "Elastic scattering of evanescent electromagnetic waves," Applied Optics, Aug. 1, 1979, 18(15):2679-2687.

Crystalline silicon—Properties and uses, Basu (ed)., Jul. 2011, Chapter 8: Defect Related Luminescence in Silicon Dioxide Network: A Review, 43 pages.

Fayngold, "Interactions Between Evanescent Photons and Environment," 2014:1-24.

Fujino, S. Fabrication of High-Purity Transparent Silica Glass by Powder Sintering Method. New Glas. 2005, 20, 19-24 (with partial English translation).

Gayán et al., "Mechanism of the synergistic inactivation of *Escherichia coli* by UV-C light at mild temperatures," Applied and Environmental Microbiology, Jul. 2013, 79(14):4465-4473.

Goldstein et al., "The Ferrioxalate and Iodide-Iodate Actinometers in the UV Region," Journal of Photochemistry and Photobiology, Jun. 14, 2007, 193:50-55.

Hatchard et al., "A New Sensitive Chemical Actinometer II. Potassium Ferrioxalate as a Standard Chemical Actinometer," Proceedings of the Royal Society A: Mathematical, Physical and Engineering Sciences, Jun. 12, 1956, 235(1203):518-536.

Hijnen et al., "Inactivation credit of UV radiation for viruses, bacteria and protozoan (oo)cysts in water: A review," Water Research, Jan. 2006, 40(1):3-22.

Hu et al., "Repair and regrowth of *Escherichia coli* after low- and medium-pressure ultraviolet disinfection," Water Science and Technology: Water Supply, 2005, 5(5)101-108.

Jalal et al., "Thermal cycling layer by layer dip coating method for oxazine formation on clad modified optical fiber core," Jan. 9-11, 2014, 2014 International Conference on Advances in Electrical Engineering (ICAEE), 4 pages.

Klubben et al., "Novel light diffusing fiber for use in medical applications," Optical Fibers and Sensors for Medical Diagnostics and Treatment Applications XVI, 2016, 970(970218):1-6.

Knudson et al., "Photoreactivation of UV-Irradiated *Legionella pneumophila* and Other *Legionella* Species," Applied and Environmental Microbiology, Apr. 1985, 49(4):975-980.

Kundu et al., "Improving the moisture stability of perovskite solar cells by using PMMA/P3HT based hole-transport layers," Materials Chemistry Frontiers, Oct. 2017, 2(1):81-89.

Lanzarini-Lopes et al., "Particle-modified polymeric cladding on glassoptical fibers enhances radial light scattering," Journal of the Optical Society of America Biomolecules, Jun. 2019, 36(6):1623-1628.

(56) References Cited

OTHER PUBLICATIONS

Lui et al., "Point-of-use water disinfection using ultraviolet and visible light-emitting diodes," Science of the Total Environment., Mar. 22, 2016, 553:626-635.

Martin-Somer et al., "Influence of light distribution on the performance of photocatalytic reactors: LED vs mercury lamps," Applied Catalysis B: Environmental, 2017, 215:1-7.

Matafonova et al., "Recent advances in application of UV light-emitting diodes for degrading organic pollutants in water through advanced oxidation processes: A review," Water Research, Jan. 4, 2018, 132:177-189.

nanocomposix.com [online], "Mie Theory Calculator," available on or before Apr. 23, 2019, retrieved on Feb. 3, 2019, retrieved from URL < https://nanocomposix.com/pages/mie-theory-calculator>, 2 pages.

Nebot Sanz et al., "Modelling of Reactivation after UV Disinfection: Effect of UV-C Dose on Subsequent Photoreactivation and Dark Repair," Water Research, May 25, 2007, 41:3141-3151.

Nieuwenhuijsen et al., "Chlorination disinfection byproducts in water and their association with adverse reproductive outcomes: a review," Occup Environ Med., 2000, 57(2):73-85.

Nobbs et al., "Kubelka-Munk Theory and the Prediction of Reflectance," Review of Progress in Coloration and Related Topics, 1985, 15:66-75.

Oguma et al., "Application of UV light emitting diodes to batch and flow-through water disinfection systems," Desalination, Sep. 14, 2013, 328:24-30.

Oldenburg, "Light scattering form gold nanoshells," Rice University, Jun. 1999, 110 pages.

Peill et al., "Development and Optimization of a Ti02-Coated Fiber Optic Cable Photocatalytic Degradation of 4-Chlorophenol," Environmental Science & Technology, 1995, 29:2974-2981.

Prieve et al., "Scattering of an evanescent surface wave by a microscopic dielectric sphere," Applied Optics, Mar. 20, 1993, 32(9):1629-1641.

Rattanakul et al., "Inactivation kinetics and efficiencies of UV-LEDs against Pseudomonas aeruginosa, Legionella pneumophila, and surrogate microorganisms," Water Research, Nov. 23, 2017, 130:31-37.

Rawson, "Analysis of scattering from fiber waveguides with irregular core surfaces," Applied Optics, 1974, 13(10):2370-2377.

Rawson, "Measurement of the Angular Distribution of Light Scattered from a Glass Fiber Optical Waveguide," Applied Optics, Nov. 1972, 11(11):2477-2481.

Roos et al., "Interpretation of integrating sphere signals for non-Lambertian samples," Applied Optics, Sep. 15, 1988, 27(18):3833-3837.

Santoro et al., "Detailed modeling of oxalic acid degradation by UV-TiO 2 nanoparticles: Importance of light scattering and photoreactor scale-up," Water Research, May 7, 2017, 121:361-373.

Schalk et al., "UV-Lamps for Disinfection and Advanced Oxidation—Lamp Types, Technologies and Applications," IUVA News, May 2005, 8(1):32-37.

Sommer et al., "UV Inactivation, Liquid-Holding Recovery, and Photoreactivation of *Escherichia coli* O157 and Other Pathogenic *Escherichia coli* Strains in Water," Journal of Food Protection, 2000, 63(8):1015-1020.

Song et al., "Application of Ultraviolet Light-Emitting Diodes (UV-LEDs) for Water Disinfection: A Review," Water Research, Mar. 2, 2016, 94:341-349.

Spigulis et al., "Glowing optical fiber design and parameters," Opt. Inorg. Dielectr. Mater. Devices, 1997, 2967(2):231-236.

Tosa et al., "Photoreactivation of Enterohemorrhagic *Escherichia coli* Following UV Disinfection," Water Research, 1999, 33(2): 361-366.

Wang et al., "Highly Efficient and Stable Perovskite Solar Cells by Interfacial Engineering Using Solution-Processed Polymer Layer," Journal of Physical Chemistry C, Jan. 10, 2017, 121:1562-1568.

Widgoff et al., "Scattering of K+ Particles," Physical Review, Nov. 1, 1956, 104(3):811-815.

Wilson et al., "Coliphage MS-2 as a UV Water Disinfection Efficacy Test Surrogate for Bacterial and Viral Pathogens," American Water Works Association: Water Quality Technology Conference, Nov. 15-19, 1992:219-235.

Wu et al., "Ballast Waters Treatment Using UV/Ag—TiO2+O3 Advanced Oxidation Process with *Escherichia coli* and Vibrio Alginolyticus as Indicator Micro-organisms," Chemical Engineering Journal, 2011, 174:714-718.

Yaun et al., "Response of *Salmonella* and *Escherichia coli* O157:H7 to UV Energy," Journal of Food Protections, 2003, 66(6):1071-1073.

Zhi et al., "Loss properties due to Rayleigh scattering in different types of fiber," Optics Express, Jan. 13, 2003, 11(1):39-47.

U.S. Appl. No. 16/355,016, filed Mar. 15, 2019, Cai et al., Sep. 17, 2020.

"Definition and Procedure for the Determination of the Method Detection Limit, Revision 2," United States Environmental Protection Agency: Washington, DC, Dec. 2016; 8 pages.

"Evaluation of Alternatives to Domestic Ion Exchange Water Softener," WateReuse Research Foundation, 2014, 56 pages.

Adleman et al., "Heterogenous Catalysis Mediated by Plasmon Heating," Nano Letters, 2009, 9(12):4417-4423.

Barton et al., "Photocatalytic activity of nanostructured $TiO_2$ coating on glass slides and optical fibers for methylene blue or methyl orange decomposition under different light excitation," J. Photochem. Photobiol. A-Chem., Nov. 2015, 317:72-80.

Bi et al., "Four release tests exhibit variable silver stability from nanoparticle-modified reverse osmosis membranes," Water Research, 2018, 143:77-86.

Businesswire [online], "Global Water Softener Market 2018-2022: Key Findings and Forecasts: Technavio," Jul. 14, 2018, 6 pages.

CASS Central Arizona Salinity Study Phase I, Dec. 2003, retrieved from URL <https://www.phoenix.gov/waterservicessite/Documents/content_wrd_cassphlrpt.pdf>, 58 pages.

CASS Central Arizona Salinity Study Phase II, Sep. 2006, retrieved from URL <https://www.phoenix.gov/waterservicessite/Documents/content_wrc_cass2rpt.pdf>, 22 pages.

Chao et al., "Assessment and opthnization of chemical and physicochemical softening processes," Journal American Water Works Association, Mar. 2002, 94(3):109-119.

Cui et al., "Photo-responsive polymers: properties, synthesis and application," Smart Polymers and their applications, Aguilar, M. R.; San Román, J. (eds)., Woodhead Publishing, 2014, Chapter 4, 41 pages.

Danion et al., "Characterization and study of a single $TiO_2$-coated optical fiber reactor," International Journal of Applied Electromagnetics and Mechanics, 2006, 23:187-201.

Danion et al., "Characterization and study of a single-$TiO_2$-coated optical fiber reactor," Appl. Catal. B-Environ., 2004, 52(3):213-223.

Danion et al., "Optimization of a single $TiO_2$-coated optical fiber reactor using experimental design," J. Photochem. Photobiol. A-Chem., 2004, 168(3):161-167.

Danion et al., "Photocatalytic degradation of imidazolinone fungicide in $TiO_2$-coated optical fiber reactor," Appl. Catal. B-Environ., Oct. 2005, 62:274-281.

Danion et al., "Malic acid photocatalytic degradation using a $TiO_2$-coated optical fiber reactor," J. Photochem. Photobiol. A-Chem., 2007, 190:13 5-140.

Doudrick et al., "Detection of Carbon Nanotubes in Environmental Matrices Using Programmed Thermal Analysis," Environ. Sci. Tech., 2012, 46:12246-12253.

Doudrick et al., "Extraction and Quantification of Carbon Nanotubes in Biological Matrices with Application to Rat Lung Tissue," ACS Nano, 2013, 7(10):8849-8856.

Dunne et al., "Micro-Capillary Coatings Based on Spiropyran Polymeric Brushes for Metal Ion Binding, Detection and Release in Continuous Flow", Sensors, Apr. 4, 2018, 18(1083):1-12.

Fries et al., Fabrication of Spiropyran-Containing Thin Film Sensors Used for the Simultaneous Identification of Multiple Metal Ions. Langmuir 2011, 27(19):12253-12260.

Fries et al., "Reversible colorimetric ion sensors based on surface initiated polymerization of photochromic polymers," Chem. Commun., 2008, (47):6288-6290.

(56) References Cited

OTHER PUBLICATIONS

Gan et al., "Photothermal Contribution to Enhanced Photocatalytic Performance of Graphene-Based Nanocomposites," ACS Nano, Aug. 25, 2014, 8(9):9304-9310.
Gifford et al., "Ranking traditional and nano-enabled sorbents for simultaneous removal of arsenic and chromium from simulated groundwater," Sci. Total Environ., Jun. 9, 2017, 601-602:1008-1014.
Global Market Insights [online], "Water Softener Market Size to Exceed $10 Billion by 2024," available on or before Sep. 11, 2018, via Internet Archive: Wayback Machine, 10 pages.
Haas et al., "Billion-fold rate enhancement of urethane polymerization via the photothermal effect of plasmonic gold nanoparticles," Chem. Sci., Jul. 31, 2015, 6:6462-6467.
He et al., "Reshaping inland concentrate management using pre-treatment and electrodialysis reversal.," Journal American Water Works Association, Feb. 2014, 106(2):64-67.
Irie, "Properties and applications of photoresponsive polymers," Pure &Appl. Chem., 1990, 62(8):1495-1502.
Lanzarini-Lopes et al., "Optical fiber-mediated photosynthesis for enhanced subsurface oxygen delivery," Chemosphere, Dec. 14, 2017, 195:742-748.
Lin et al., "Enhanced photocatalysis using side-glowing optical fibers coated with Fe-doped $TiO_2$ nanocomposite thin films," J. Photochem. Photobiol. A-Chem., Apr. 15, 2015, 307-308:88-98.
Ling et al., "Coupling Light Emitting Diodes with Photocatalyst-Coated Optical Fibers Improves Quantum Yield of Pollutant Oxidation," Environmental Science and Technology, 2017, 51(22):13319-13326.
Linsley et al., "Recent advances in light-responsive on-demand drug-delivery systems," Therapeutic Delivery, Jan. 16, 2017, 8(2):89-107.
Marinangeli et al., "Photoassisted heterogeneous catalysis with optical fibers," AIChE Journal, Jul. 1977, 23(4):415-426.
Marinangeli et al., "Photoassisted heterogeneous catalysis with optical fibers: 2. Non-isothermal single fiber and fiber bundle," AIChE Journal, 1980, 26(6):1000-1008.
Markovski et al., "Nano-enabling of strong-base ion-exchange media via a room-temperature aluminum (hydr)oxide synthesis method to simultaneously remove nitrate and fluoride," Sci. Total Environ., 2017, 599:1848-1855.
Nicoletta et al., "Light Responsive Polymer Membranes: A Review," Membranes, 2012, 2:134-197.
PCT International Search Report and Written Opinion in International Appln. PCT/US2019/053733, dated Dec. 11, 2019, 9 pages.
Peill et al., "Chemical and physical characterization of a $TiO_2$-coated fiber optic cable reactor," Environmental Science & Technology, 1996, 30(9):2806-2812.
Peill et al., "Development and optimization of a $TiO_2$ coated fiber optic cable reactor—Photocatalytic degradation of 4-chlorophenol," Environmental Science & Technology, 1995, 29(12):2974-2981.
Peill et al., "Mathematical model of a photocatalytic fiber-optic cable reactor for heterogeneous photocatalysis," Environmental Science & Technology, 1998, 32(3):398-404.
Rosario et al., "Photon-Modulated Wettability Changes on Spiropyran-Coated Surfaces," Langmuir, 2002, 18(21):8062-8069.
Scarmagnani et al., "Photoreversible ion-binding using spiropvran modified silica microbeads," International Journal of Nanomanufacturing, 2010, 5(1-2):38-52.
Suzuki et al., "Photo-reversible $Pb^{2+}$-complexation of insoluble poly(spiropyran methacrylate-co-perfluorohydroxy methacrylate) in polar solvents," Chem. Commun., Jul. 10, 2003, (16):2004-2005.
Suzuki et al., "Photo-reversible $Pb^{2+}$-complexation of thermosensitive poly(N-isopropyl acrylamide-co-spiropyran acrylate) in water," Chem. Commun., Aug. 13, 2004, (18):2036-2037.
Tandon et al., "Nano-engineered optical fibers and applications," Nanophotonics, 2013, 2(5-6):383-392.
Tugaoen et al., "Compact light-emitting diode optical fiber immobilized $TiO_2$ reactor for photocatalytic water treatment," Sci. Total Environ., Oct. 2017, 613-614:1331-1338.

Wang et al., "The light transmission and distribution in an optical fiber coated with $TiO_2$ particles," Chemosphere, 2003, 50(8):999-1006.
Wang et al., "Controlling Binding Affinities for Anions by a Photoswitchable Foldamer," Organic Letters, 2010, 12(16):3630-3633.
Wei et al., "Stimuli-responsive polymers and their applications," Polym. Chem., Oct. 2016, 8:127-143.
Xu et al., "Photocatalytic activity on $TiO_2$ -coated side-glowing optical fiber reactor under solar light," J. Photochem. Photobiol. A-Chem., May 27, 2008, 199(2-3):165-169.
Ibhadon et al., "Heterogeneous photocatalysis: recent advances and applications." Catalysts 3.1 (2013): 189-218.
Li et al., "A photocatalytic reactor derived from microstructured polymer optical fiber preform." Optics Communications 286 (2013): 182-186.
Lin et al., "Development of an optical fiber monolith reactor for photocatalytic wastewater treatment." Journal of Applied Electrochemistry 35.7 (2005): 699-708.
Lin, Photocatalysis in a novel semiconducting optical fiber monolithic reactor for wastewater treatment. Diss. Tsinghua University, China, 1996, 169 pages.
O'Neal Tugaoen et al., Compact light-emitting diode optical fiber immobilized TiO2 reactor for photocatalytic water treatment. Sci Total Environ., 2018, 613-614:1331-1338.
Peill et al., "Mathematical model of a photocatalytic fiber-optic cable reactor for heterogeneous photocatalysis." Environmental science & technology 32.3 (1998): 398-404.
Peill et al., "Solar-powered photocatalytic fiber-optic cable reactor for waste stream remediation." Journal of solar energy engineering 119.3 (1997): 229-236.
Peill, Fiber-optic bundled array cable reactors for heterogeneous photocatalysis and waste stream remediation. Diss. California Institute of Technology, 1997, 250 pages.
Zhu et al., "A novel fluidized-bed-optical-fibers photocatalytic reactor (FBOFPR) and its performance." Applied Catalysis A: General 471 (2014): 136-141.
Bagwe et al., "Surface modification of silica nanoparticles to reduce aggregation and nonspecific binding," Langmuir. Apr. 25, 2006, 22(9):4357-62.
Bayrakceken et al., "Resonance Fluorescence of Fused Silica by the Depopulation of the Ground State," International Journal of Photoenergy, vol. 2012, Article ID 359384, 3 pages, (Year: 2012).
Belz et al., "Optical detection techniques and light delivery with UV LEDs and optical fibres," Journal of Physics: Conference Series, vol. 85, Third International Conference on Optical and Laser Diagnostics (Icolad 2007) May 22-25, 2007, 7 pages.
Bishop [online], "Summer scholar purifies water with fibers,"LLNL, Jul. 26, 2017, URL <https://www.llnl.gov/news/summer-scholar-purifies-water-fibers>, 3 pages.
Glover et al. [online], "Laser Generated Side-emitting Fibers for Anti-microbial Applications," Jan. 12, 2017, URL <https://www.laserchirp.com/2017/01/laser-generated-side-emitting-fibers-for-anti-microbial-applications/>, 6 pages.
Lanzarini-Lopes et al., "Germicidal glowsticks: Side-emitting optical fibers inhibit *Pseudomonas aeruginosa* and *Escherichia coli* on surfaces," Water Research, 2020, 184:116191.
Lanzarini-Opes et al., "Nanoparticle and Transparent Polymer Coatings Enable UV-C Side-Emission Optical Fibers for Inactivation of *Escherichia coli* in Water," Environmental Science & Technology, 2019, 53(18):10880-10887.
Lanzarini-Lopes, "Visible and Ultraviolet Light Side-Emitting Optical Fibers Enable Water Purification," Dissertation, Arizona State University, May 2020, 209 pages.
Naqvi et al., "Uniform Thin Films on OPtical Fibers by Plasma-Enhanced Chemical Vapor Deposition: Fabrication, Mie Scattering Characterization, and Application to Microresonators," Journal of Lightwave Technology, vol. 36, No. 23, pp. 5580-5586, 1 Dec. 1, 2018.
Rivero et al., "Optical Fiber Sensors Based on Polymeric Sensitive Coatings," Polymers. Mar. 7, 2018; 10(3):280, 26 pages.
Simon, "Optical Fibers for Water Treatment," LLNL, 17-FS-021, 2017, 34 pages.

(56) References Cited

OTHER PUBLICATIONS

Spallino et al., "Visible-ultraviolet vibronic emission of silica nanoparticles," Phys. Chem. Chem. Phys., 2014, 16(40):22028-22034.

Suteewong et al., "Highly Aminated Mesoporous Silica Nanoparticles with Cubic Pore Structure," J. Am. Chem. Soc. 2011, 133, 2, 172-175.

Takada et al., "Bactericidal effects of 310 nm ultraviolet light-emitting diode irradiation on oral bacteria," BMC Oral Health (2017) 17:96, 10 pages.

Urrutia et al., "Optical Fiber Sensors Based on Nanoparticle-Embedded Coatings," Journal of Sensors. 2015. 2015:805053. 18 pages.

\* cited by examiner

Azobenzene

Nano-pellet

FIG. 14

PHOTORESPONSIVE POLYMER COATED OPTICAL FIBERS FOR WATER TREATMENT

CROSS-REFERENCE TO RELATED APPLICATION

This application claims the benefit of U.S. Provisional Application No. 62/770,221 entitled "PHOTORESPONSIVE POLYMER COATED OPTICAL FIBERS FOR WATER TREATMENT" and filed Nov. 21, 2018, which is incorporated herein by reference in its entirety.

STATEMENT OF GOVERNMENT INTEREST

This invention was made with government support under 1449500 awarded by the National Science Foundation. The government has certain rights in the invention.

TECHNICAL FIELD

This invention relates to photoresponsive polymer coated optical fibers for water treatment.

BACKGROUND

Ion exchange polymers have been used to adsorb and/or desorb ionic contaminants from water. However, ion exchange polymers typically require a high concentration of salts or an extreme pH to adsorb/desorb the ionic contaminants. Moreover, the concentrated salts and acidic or alkaline brines must be processed following removal of ionic contaminants. Other methods for removing ions from water (e.g., softening hard water) include low pressure reverse osmosis, high pressure membranes, electro-chemical/magnetic processes, and addition of chemical chelators or other anti-scalants. These methods have drawbacks, including health risks and limited wastewater reuse.

SUMMARY

An integrated photoreactor design containing photoresponsive polymer-coated fiber optics can be used purify water or recover precious metals, anions, and cations (e.g., divalent cations) from the water. The photoreactor design allows for the use of multiple light sources in conjunction with immobilized photoresponsive polymers on fiber optics turned to absorbing contaminants of interest. Systems and methods described herein are achieve high water recovery (>98%), allow a high level of spatial and temporal control, and are advantageously noninvasive, convenient, low energy, low pressure, and chemical free.

In a first general aspect, a photoreactor includes a reservoir configured to hold water, and a multiplicity of optical fiber assemblies positioned in the reservoir. The reservoir defines an inlet and an outlet. Each optical fiber assembly includes one or more optical fibers coated with a composition comprising a photoresponsive polymer and a light source optically coupled to the one or more optical fibers. The photoresponsive polymer undergoes a change from an initial state to an irradiated state when irradiated with light from the light source, and the photoresponsive polymer in the irradiated state is adapted to bind an ion from the water.

Implementations of the first general aspect may include one or more of the following features.

The photoresponsive polymer undergoes a structural change from the initial state to the irradiated state. The photoresponsive polymer undergoes isomerization from the initial state to the irradiated state. The photoresponsive polymer undergoes a change in charge from the initial state to the irradiated state. The photoresponsive polymer is typically electrically neutral in the initial state and ionized in the irradiated state. The photoresponsive polymer undergoes a change in dipole moment from the initial state to the irradiated state.

The photoresponsive polymer undergoes a change from the irradiated state to the initial state when irradiation with light from the light source is ceased, and the photoresponsive polymer in the initial state is adapted to release the bound ion. The photoresponsive polymer undergoes a change from the irradiated state to the initial state when irradiated with visible light, and the photoresponsive polymer in the initial state is adapted to release the bound ion.

The light source is configured to provide ultraviolet light, visible light, infrared light, or any combination thereof to the one or more optical fibers. The light source is configured to provide filtered sunlight to the one or more optical fibers. The light source is polychromatic or monochromatic.

The photoresponsive polymer includes azobenzene or spiropyran. The composition includes photothermal nanoparticles, nanostructured carbon, or a combination thereof. The photoresponsive polymer in the irradiated state is adapted to bind a divalent cation, such as calcium or magnesium. The photoresponsive polymer in the irradiated state is adapted to bind an anion, such as phosphate or arsenate.

In a second general aspect, a photoreactor system includes a first photoreactor and a second photoreactor, an inlet conduit fluidly coupled to the first photoreactor and the second photoreactor, and a first outlet conduit and a second outlet conduit fluidly coupled to the first photoreactor and the second photoreactor. The inlet conduit is configured to provide untreated water to the first photoreactor and the second photoreactor, The first outlet conduit is configured to remove treated water from the first photoreactor and the second photoreactor, and the second outlet conduit is configured to remove contaminants from the first photoreactor and the second photoreactor. Each photoreactor includes a reservoir configured to hold water and a multiplicity of optical fiber assemblies positioned in the reservoir. Each reservoir defines an inlet and an outlet, and each optical fiber assembly includes one or more optical fibers coated with a composition comprising a photoresponsive polymer and a light source optically coupled to the one or more optical fibers. The photoresponsive polymer undergoes a change from an initial state to an irradiated state when irradiated with light from the light source, and the photoresponsive polymer in the irradiated state is adapted to bind an ion from the water.

Implementations of the second general aspect may include the following feature.

The first photoreactor and the second photoreactor are configured to operate alternately, such that photoresponsive polymer in the first photoreactor is in the initial state while the photoresponsive polymer in the second photoreactor is in the irradiated state and vice versa.

In a third general aspect, treating water to remove ions includes providing water to be treated to a photoreactor including a light source coupled to an optical fiber. The water includes ions and the optical fiber is coated with a photoresponsive polymer. The light source is operated to provide light to the optical fiber, thereby irradiating the photoresponsive polymer such that the photoresponsive polymer undergoes a change from an initial state to an irradiated state. Ions in the water are bound with the photoresponsive polymer in the irradiated state, and the photoresponsive polymer is altered to release the bound ions, wherein altering the photoresponsive polymer comprises ceasing or altering irradiation with the light source.

Thus, particular embodiments have been described. Variations, modifications, and enhancements of the described embodiments and other embodiments can be made based on what is described and illustrated. In addition, one or more features of one or more embodiments may be combined. The details of one or more implementations and various features and aspects are set forth in the accompanying drawings, the description, and the claims below.

DETAILED DESCRIPTION

Photoreactors and photoreactor systems described herein use photoresponsive polymer coatings on optical fibers to trap ionic contaminants in water by irradiating the photoresponsive polymer coatings with light from a light source to alter regions of the polymer, thereby adsorbing contaminants from the water. The altered polymer returns to its initial state when irradiation is discontinued, thereby desorbing the contaminants. Light launched from the fiber optic core undergoes refraction on the fiber edge, which is coated with photoresponsive polymer. When the light is on, the photoresponsive polymer coating adsorbs contaminants (e.g., inorganic or organic ions) from a flowing stream of water. When the water flow is turned off and the light is cycled off, the polymer changes to its initial state and releases these ions, which can then be flushed away into a waste stream. Cycling of the water flow and light allow semi-continuous treatment of water.

Light actuates the photoresponsive polymer structure or functional groups, transforming the polymer by altering its structure or charge, such that the polymer can act as an ion-exchanger to complex cations (e.g., ions of Ca, Mg, Cu, Li, Cd, Zn, etc.) or anions (e.g., arsenic, phosphate, etc.) in water. This activation process allows selective contaminants to be adsorbed by the polymer surface. When the light is turned off, the polymer returns to its shape or charge to release the adsorbed contaminant. The optical properties of the fiber optic can be tuned depending upon the wavelength of light from the light source, as needed to activate the photoresponsive polymers.

In one example, photo responsive polymer coated on an optical fiber adsorbs calcium ions from water upon activation by light launched into the optical fiber. After reaching saturation (e.g., detected by a photosensor coupled to the optical fiber), the light is turned off, and adsorbed calcium ions are released into the water, which is flushed out as a wastewater stream. This cycle can be repeated indefinitely without by use of chemical additives by cycling the light and waste valves.

Photoreactors and photoreactor systems described herein can also be used to soften water (e.g., remove divalent cations such as calcium and magnesium from water) which, left untreated, can cause scaling in water treatment units (e.g., pipes, heat exchanger, boiler, membranes, etc.). Unlike conventional ion exchange processes, photoresponsive polymer coated optical fibers advantageously capture and release contaminants without addition of chemicals and do not require high salt concentration or extreme pH ranges to operate. Moreover, photoreactors described herein are compact and require little horizontal surface area, allowing placement in compact locations. The photoreactors can be powered by renewable (sun) energy with appropriate filter gratings or use power grid for water purification and operation. Moreover, photoreactors and photoreactor systems described herein require no addition of chemicals and can be used to treat drinking water, industrial water, produced water from oil and gas operations, and water from other sources.

Figure 1:
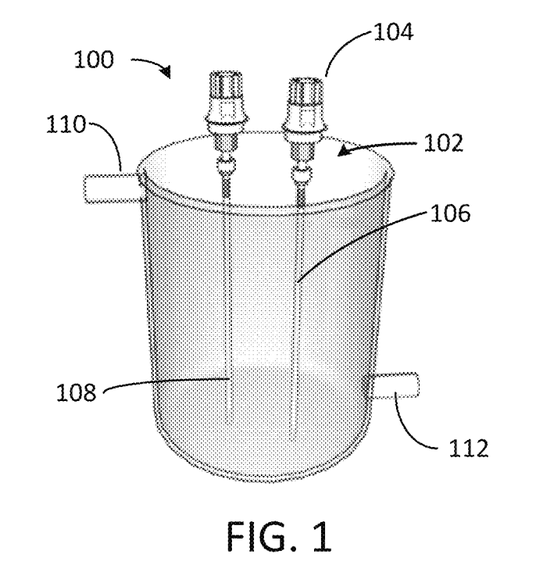
FIG. 1 depicts a photoreactor configured to remove ionic contaminants from water.

Referring to FIG. 1, photoreactor 100 includes optical fiber assemblies 102, each including light source 104 optically coupled to optical fiber 106. Photoreactor 100 may include a multiplicity of optical fiber assemblies. Light source 104 may provide ultraviolet (UV), visible, or infrared (IR) light. Suitable light sources include light emitting diodes (LEDs), white light sources, black lamps, and other appropriate sources. In some cases, natural sunlight is be filtered to a target wavelength and concentrated using reflective surfaces for off-grid or remote operation. Light source 104 may be polychromatic or monochromatic. Multiple light sources (such as visible and UV at various wavelengths) may be used together or simultaneously as appropriate. In one example, light source 104 is a light emitting diode (LED) that emits light at 318 nm.

Optical fibers 106 may be plastic or glass. In some cases, a diameter of optical fibers 106 is up to 1 mm in diameter. Light source 104 launches light into optical fibers 106. Optical fibers 106 are coated with photoresponsive polymer 108. Radial light emission along the length of optical fibers 106 can be controlled by influencing the refractive index on the surface of the optical fiber. In some cases, the refractive index on the surface of optical fibers 106 may be altered by altering a thickness of photoresponsive polymer 108 on the optical fibers (e.g., by disposing two, three, or more layers of the photoresponsive polymer on the optical fibers). Photoreactor 100, suitable for batch processing, may include inlet 110 for feed water and outlet 112 for treated water. Photoreactor 100 can remove ions such as cations (e.g., metals including $Cu^{2+}$, $Li^+$, $Ca^{2+}$, $Mg^{2+}$) and anions (e.g., $PO_4^{3-}$, $AsO_3^-$) from the feed water.

Figure 2:
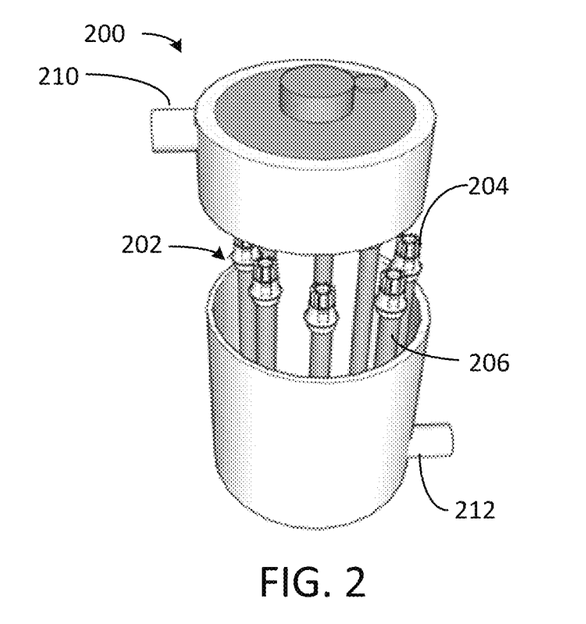
FIG. 2 depicts a photoreactor configured to remove ionic contaminants from water.

Referring to FIG. 2, photoreactor 200 includes optical fiber assemblies 202. Each optical fiber assembly 202 includes light source 204 and optical fiber bundle 206. Light source 204 may provide with ultraviolet (UV), visible, or infrared (IR) light. Suitable light sources include light emitting diodes (LEDs), white light sources, black lamps, and other appropriate sources. Light source 204 launches light into optical fiber bundle 206. In some cases, natural sunlight is be filtered to a target wavelength and concentrated using reflective surfaces for off-grid or remote operation. Light source 104 may be polychromatic or monochromatic. Multiple light sources (such as visible and UV at various wavelengths) may be used together or simultaneously as appropriate. In one example, light source 204 is a light emitting diode (LED) that emits light at 318 nm.

Optical fiber bundle 206 may be plastic or glass. In some cases, a diameter of optical fibers 206 is up to 1 mm in diameter. Each optical fiber bundle 206 may include multiple optical fibers (e.g., tens to hundreds of optical fibers), each coated with photoresponsive polymer. Optical fiber bundles 206 may be spaced in a pattern or uniformly in photoreactor 200. Each optical fiber in optical fiber bundle 206 is coated with photoresponsive polymer. Radial light emission along the length of the optical fibers can be controlled by influencing the refractive index on the surface of the optical fiber. In some cases, the refractive index on the surface of the optical fibers may be altered by altering a thickness of the photoresponsive polymer on the optical fibers (e.g., by disposing two, three, or more layers of the photoresponsive polymer on the optical fibers). Photoreactor 200, suitable for batch processing, may include inlet 210 for feed water and outlet 212 for treated water. Photoreactor 200 can remove ions such as cations (e.g., metals including $Cu^{2+}$, $Li^+$, $Ca^{2+}$, $Mg^{2+}$) and anions (e.g., $PO_4^{3-}$, $AsO_3^-$) from the feed water.

Figure 3:
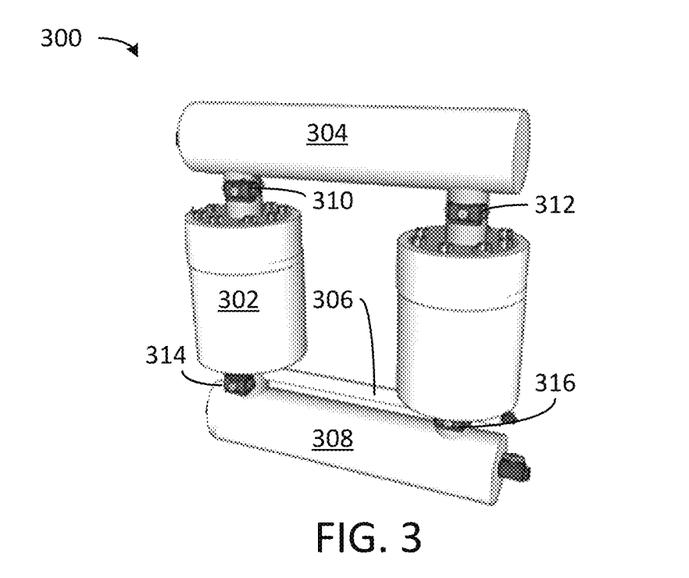
FIG. 3 depicts a photoreactor system configured to remove ionic contaminants from water.

Referring to FIG. 3, photoreactor system 300 includes one or more photoreactors 302 fluidly coupled to inlet conduit 304 and outlet conduits 306, 308. Photoreactors 302 include optical fiber assemblies, such as optical fiber assemblies 102 and 202 described with respect to FIGS. 1 and 2, respectively. Feed water enters treatment units 302 through inlet conduit 304. Wastewater exits treatment units 302 through outlet conduit 306, and treated water exits treatment units 302 through outlet conduit 308. Photoreactor system 300 can remove ions such as cations (e.g., metals including $Cu^{2+}$, $Li^+$, $Ca^{2+}$, $Mg^{2+}$) and anions (e.g., $PO_4^{3-}$, $AsO_3^-$) from the feed water.

Photoreactor system 300 may operate continuously by switching solenoid valves 310, 312 that govern inflow from inlet conduit 304 to photoreactors 302, and solenoid valves 314, 316 that govern outflow to outlet conduits 306, 308. During operation, one of photoreactors 302 may remain active with light sources turned on (i.e., radiating light), and the photoresponsive polymer coating on the optical fibers activated and adsorbing contaminants, while another photoreactor 302 is idle (i.e., not radiating light). Desorbed contaminant from the idle photoreactor is removed from photoreactor system 300 through outlet conduit 306. That is, one photoreactor 302 undergoes the adsorption process by activating photoresponsive polymers while another photoreactor 302 executes the desorption process. Time intervals for photoreactor operation, either adsorption or desorption, depends at least in part on the incoming water quality and targeted contaminant concentration, as well as effective adsorption onto the photoresponsive polymers (kinetics). Before switching operation of photoreactors 302 from adsorption to desorption and vice versa, there may be a short time interval for cleaning the idle photoreactor fully before activation. The switching (idle and active) may be controlled by an automated control system that actuates solenoid valve operation (opening/closing). During switching and cleaning operations, solenoid valves may be closed briefly (e.g., for few seconds) so that no adsorption or desorption occurs.

When light is launched into optical fibers of photoreactors described herein, the light waves pass into the photoresponsive polymers. This "photo signal" is transformed to a "chemical signal" that transforms a property of the photoresponsive polymer. Properties that may be altered include geometrical structure (e.g., from cis to trans or vice versa), charge (e.g., from ionic to nonionic or vice versa), dipole moment, and physical properties (e.g., viscosity). Ions in water flowing through the photoreactor interact with and are adsorbed by the photoresponsive polymer. After adsorption, the light is turned off, and the adsorbed ions are released and can be recovered or flushed out.

Figure 4:
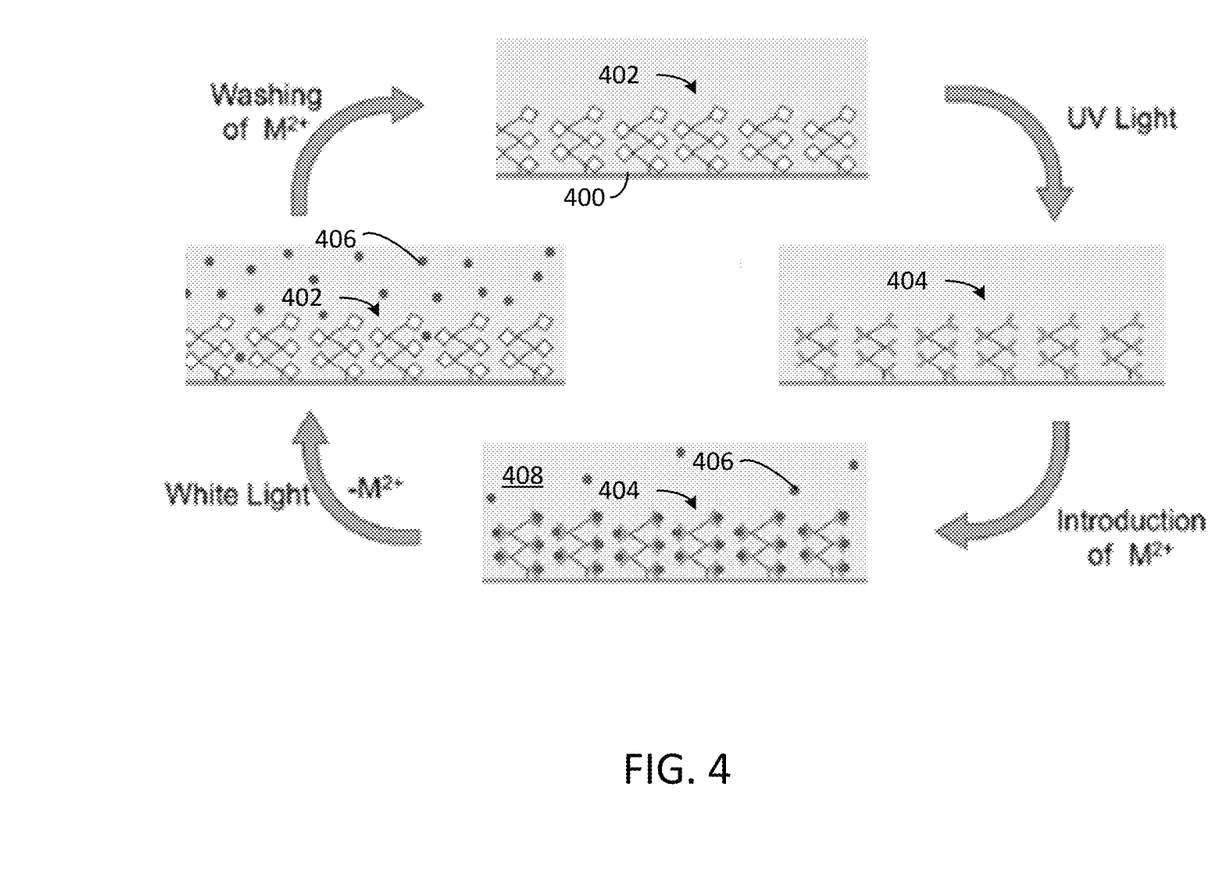
FIG. 4 depicts cyclic separation and release of divalent ions with a photoresponsive polymer.

FIG. 4 depicts an adsorption-desorption cycle of a divalent cation ($M^{2+}$), illustrated with optical fiber 400 coated with a photoresponsive polymer 402. Irradiation of photoresponsive polymer 402 with UV light yields chelating polymer 404. Divalent metal cations 406 introduced into feed water 408 are bound by the chelating polymer 404. When white light is applied to (or UV light is removed from) the chelating polymer 404, the chelating polymer is deactivated and returns to the initial photoreponsive polymer 402, releasing metal ions 406. Metal ions 406 can be washed away.

Examples of suitable photoresponsive polymers include azobenzenes and spiropyrans.

Figure 5:
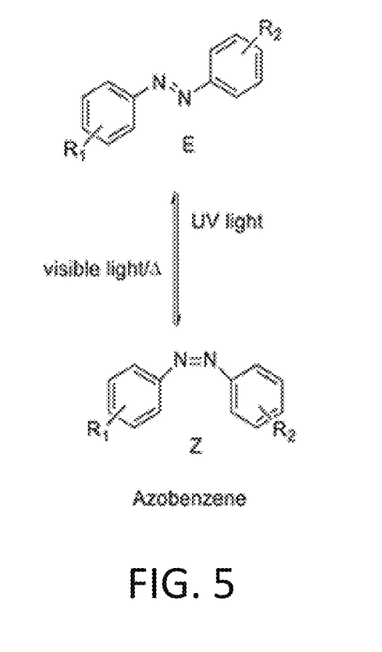
FIG. 5 depicts azobenzene transformation under UV light.

Azobenzene is a photoresponsive polymer that transforms from trans- to cis-under UV irradiation at 365 nm as shown FIG. 5.

Figure 6:
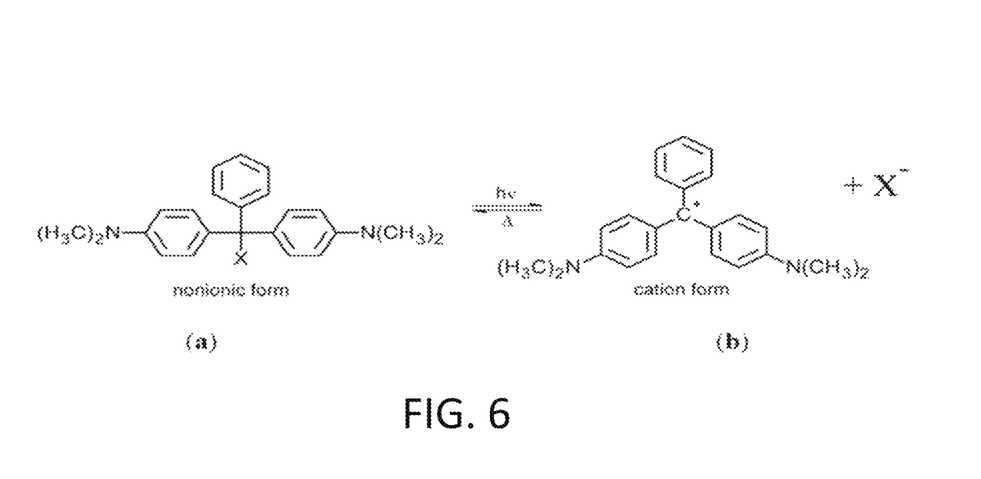
FIG. 6 depicts photo-induced structure change of a triphenylmethane molecule from non-ionic form (a) to cationic form (b) for desorption of anions.

Other photoresponsive polymers are capable of altering electrostatic conditions as the driving force for the conformation changes. In one example, triphenylmethane dissociates into ion-pairs under UV irradiation (>270 nm), generating an intensely green colored triphenylmethyl cation (b), which is hydrophilic in nature, from its original transparent non-ionic, hydrophobic form (a), as shown in FIG. 6. When irradiation is ceased, it returns to its initial state (a), and absorption intensity (color) decreases with a half-life of about 3 minutes.

Figure 7:
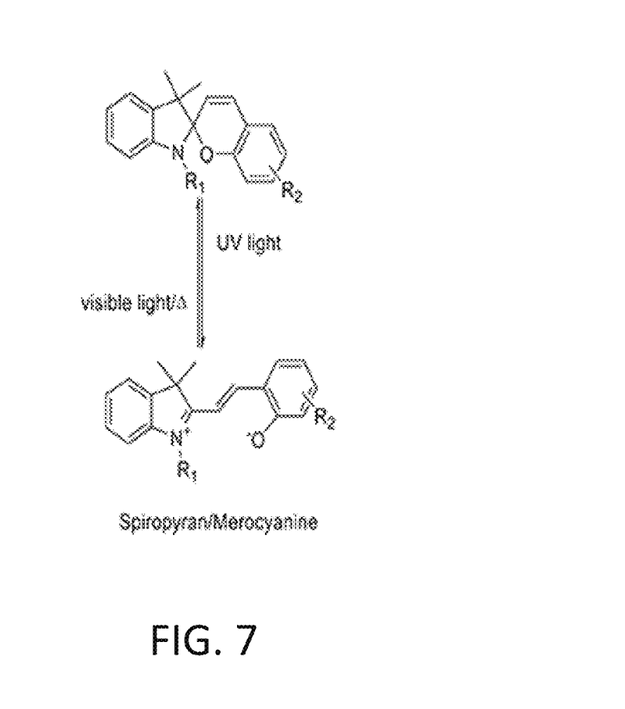
FIG. 7 depicts spiropyran transformation under UV light.

Spiropyrans are also photoresponsive polymers. Upon irradiation, these polymers become polar, as depicted in FIG. 7, to an open merocyanine form, which can complex metal ions, thereby influencing the isomerization form. Ceasing of irradiation results in a high concentration of the closed form, thereby releasing complexed metal ions. PMMA-spiropyrans have an advantageously low cytotoxicity, and the spiropyran and open merocyanine isomers have very different properties after C—O cleavage. Compared to the spiropyran isomer, the merocyanine form tends to bind divalent metal ions, with the interaction taking place through the merocyanine's phenoate oxygen.

Alternative polymers can be synthesized by combining beneficial attributes of multiple polymers. While the binding strength of individual merocyanine moeities to metal ions can be weak, the stability of the complex can be increased by pre-organizing two or more merocyanine groups (e.g., on a polymer backbone). In one embodiment, a merocyanine unit can be equipped with additional metal binding groups and the resulting bidentate ligand can be used to form complexes of 1:1 stoichiometry. For example, merocyanine can be connected to a polymethyl methacrylate (PMMA) chain by an ester group serving as an additional coordinative group.

In one example, spiropyran methyl methacrylate (SPMA) is synthesized and polymerized with methyl methacrylate (MMA) to form poly(MMA-co-SPMA) (atom transfer radical polymerization) and coated onto glass. The concentration of the SPMA moiety can be varied to create coated optical fibers with different film thicknesses.

Photoresponsive polymers, such as spiropyrans and azobenzene, can be used to coat optical fibers for removal of cations or metals. Photoreactors and photoreactor systems described herein with spiropyrans and azobenzene will allow targeted metals, such as calcium, magnesium, copper, silver, etc. to bind to the activated polymer from bulk water. When the UV light is turned off (or visible light is applied), these polymers return to their initial, closed-ring, non-ionic form, and the adsorbed cations are released or flushed out. Precious metals, such as lithium, silver, etc., can be similarly recovered from bulk water.

Figure 8:
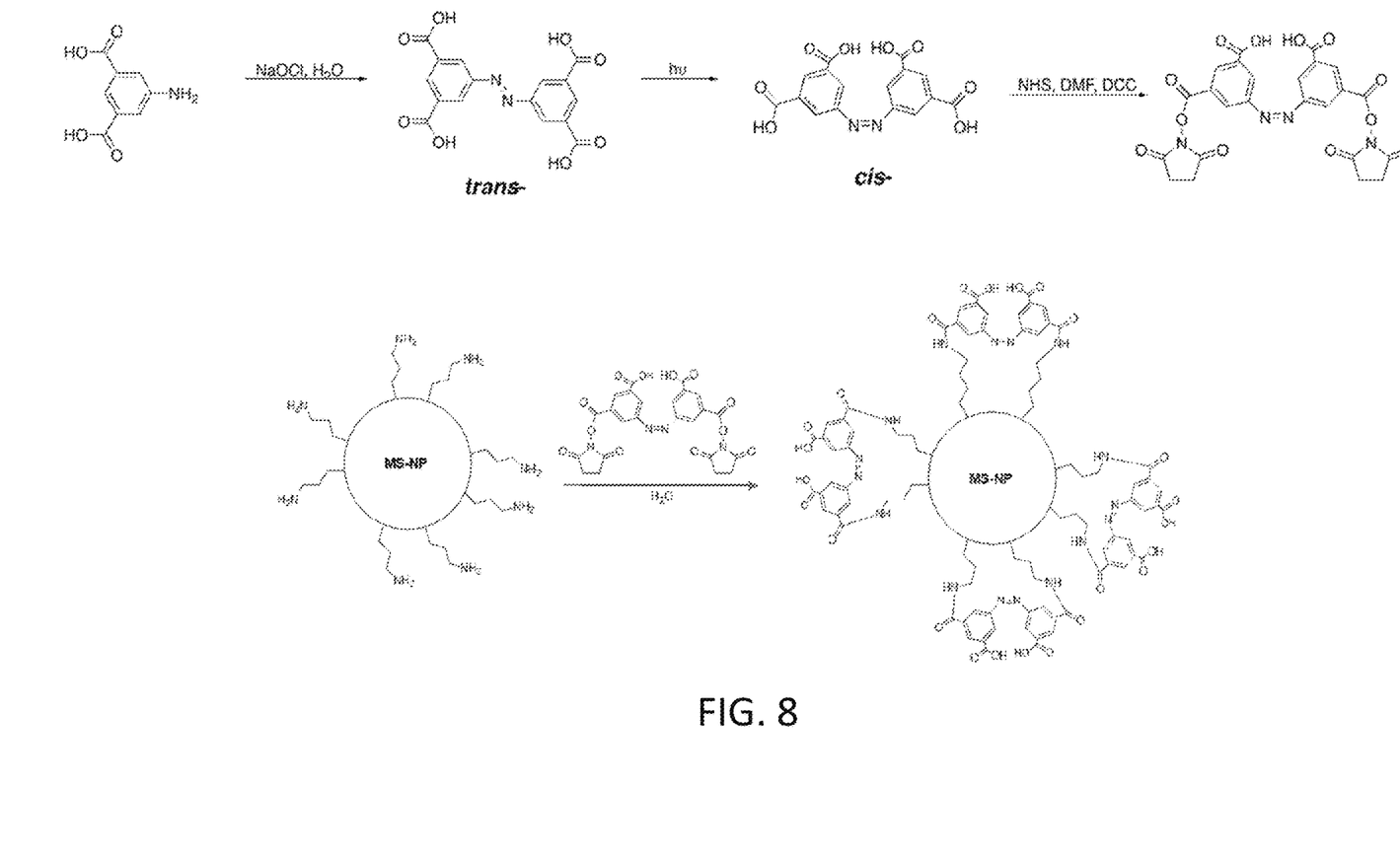
FIG. 8 depicts photoresponsive polymer synthesis and attachment on a mesoporous silica nanoparticle (MS-NP).

Photo-responsive polymers (e.g., azobenzene or spiropyrans) may be directly coated onto a substrate, (e.g., optical fiber or microsphere (MS) nanoparticles) by dip coating or by other coating means or attached to substrate by surface silanization. Azobenzene synthesis is depicted in FIG. 8 (NETS=N-hydroxysuccinimide; DMF=N,N'-dimethylformamide; DCC=N,N'-dicyclohexylcarbodiimide).

Figure 9:
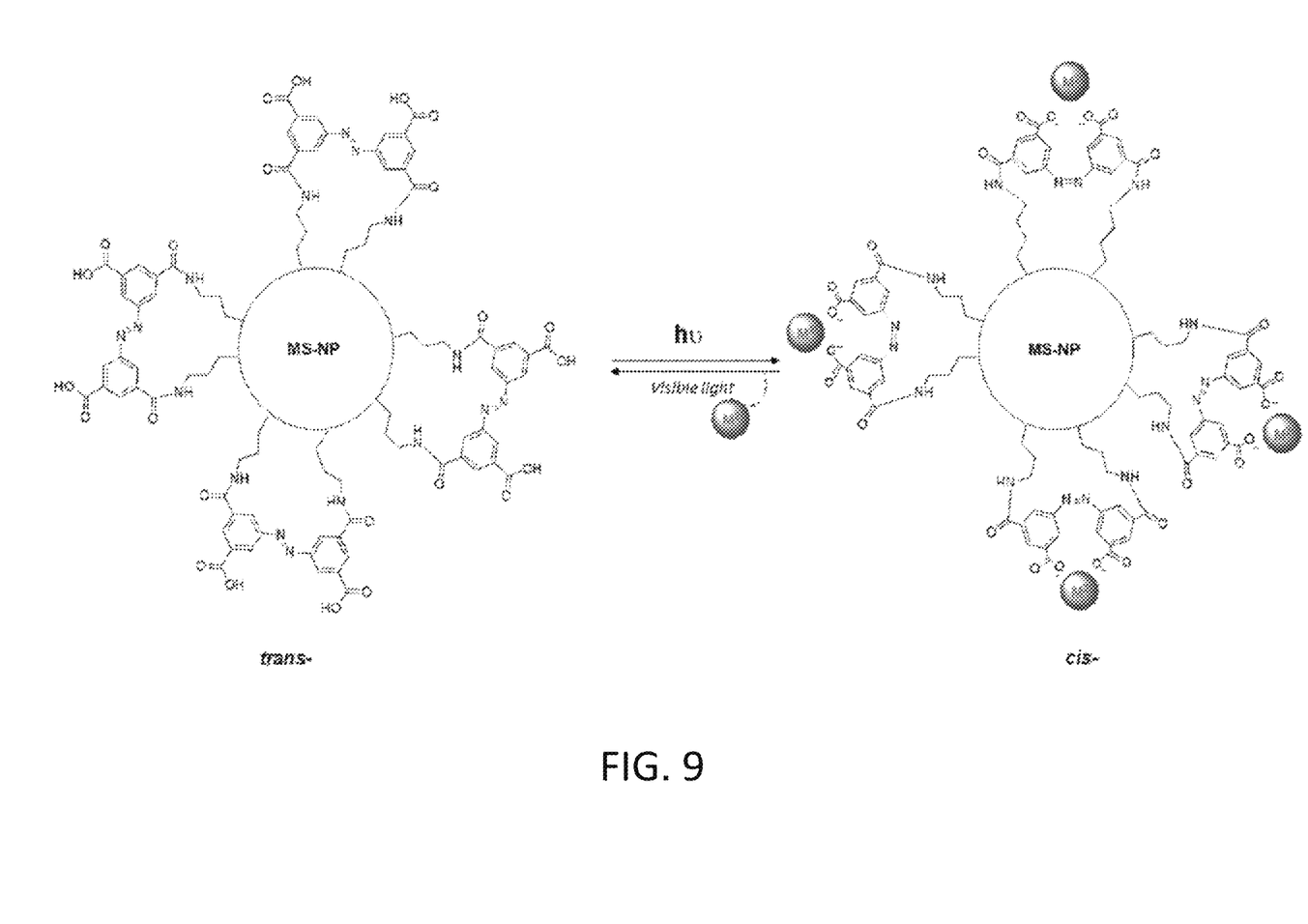
FIG. 9 depicts photoreaction of the photoresponsive MS-NP in FIG. 8.

Azobenzene functionalized with $RCO_2$ binding groups positioned as shown in FIG. 9 (MS-NP=mesoporous silica nanoparticle) can also be used as photoresponsive polymers. Upon photoconversion from trans- to cis-form under irradiation, cations (e.g., silver ions) are adsorbed and, when the light is turned-off (or visible light irradiated), the ions desorb due to the increased binding distance of the chelator in the trans-configuration.

Figure 10:
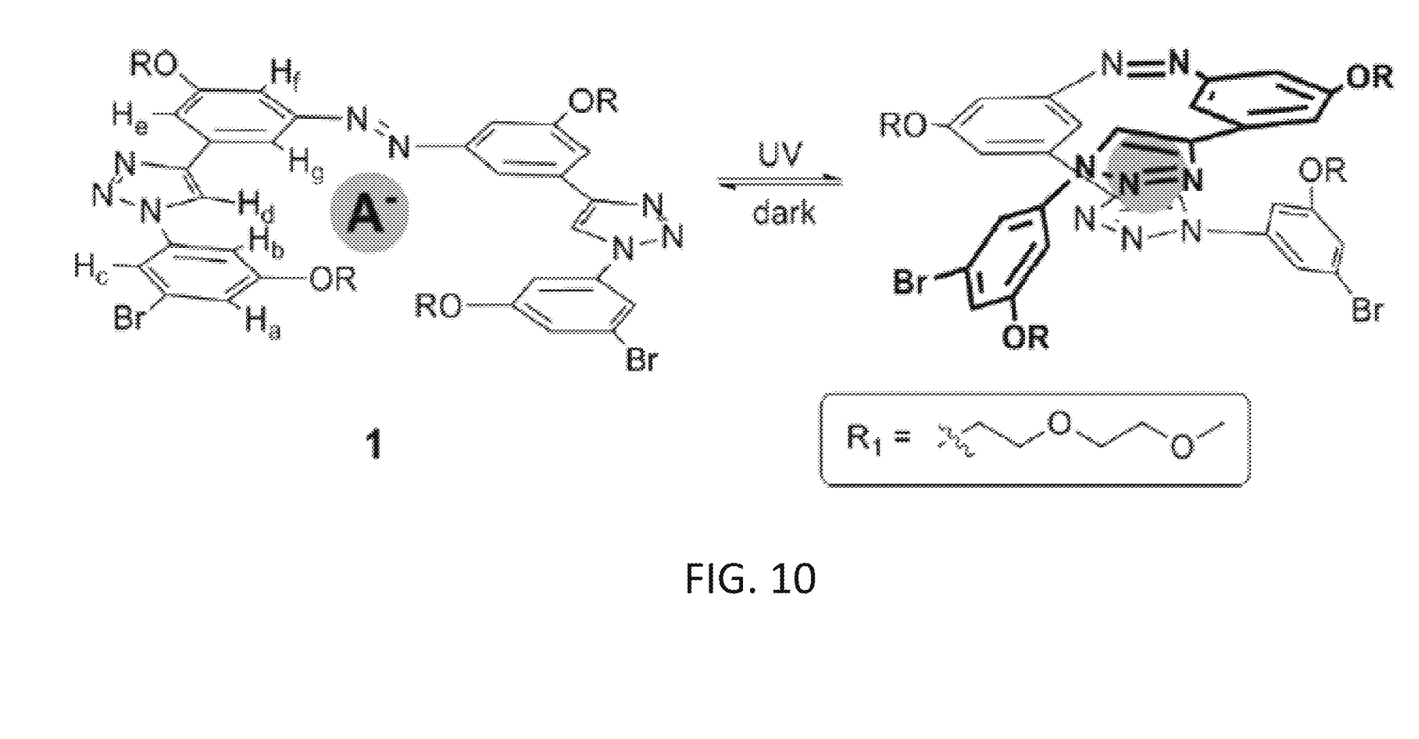
FIG. 10 depicts azobenzene-phenyltriazole "foldamers" for binding anions.

For removing anions, such as arsenate or phosphate, other photoresponsive polymers may be used as anion exchangers to remove these contaminants from flowing water. In one example, azobenzene with phenyltriazole oligomers provide photoswitchable groups as "foldamers" with controllable changes in binding affinity for anions as shown below. In the initial trans-configuration, the anion binding is weak due at least in part to extended configuration. Upon UV irradiation, as depicted in FIG. 10, the cis-configuration of the binding to anions is strengthened with spatial preference between the anions and the receptor (e.g., achieved due at least in part to reversible photoisomerization ability).

Figure 11:
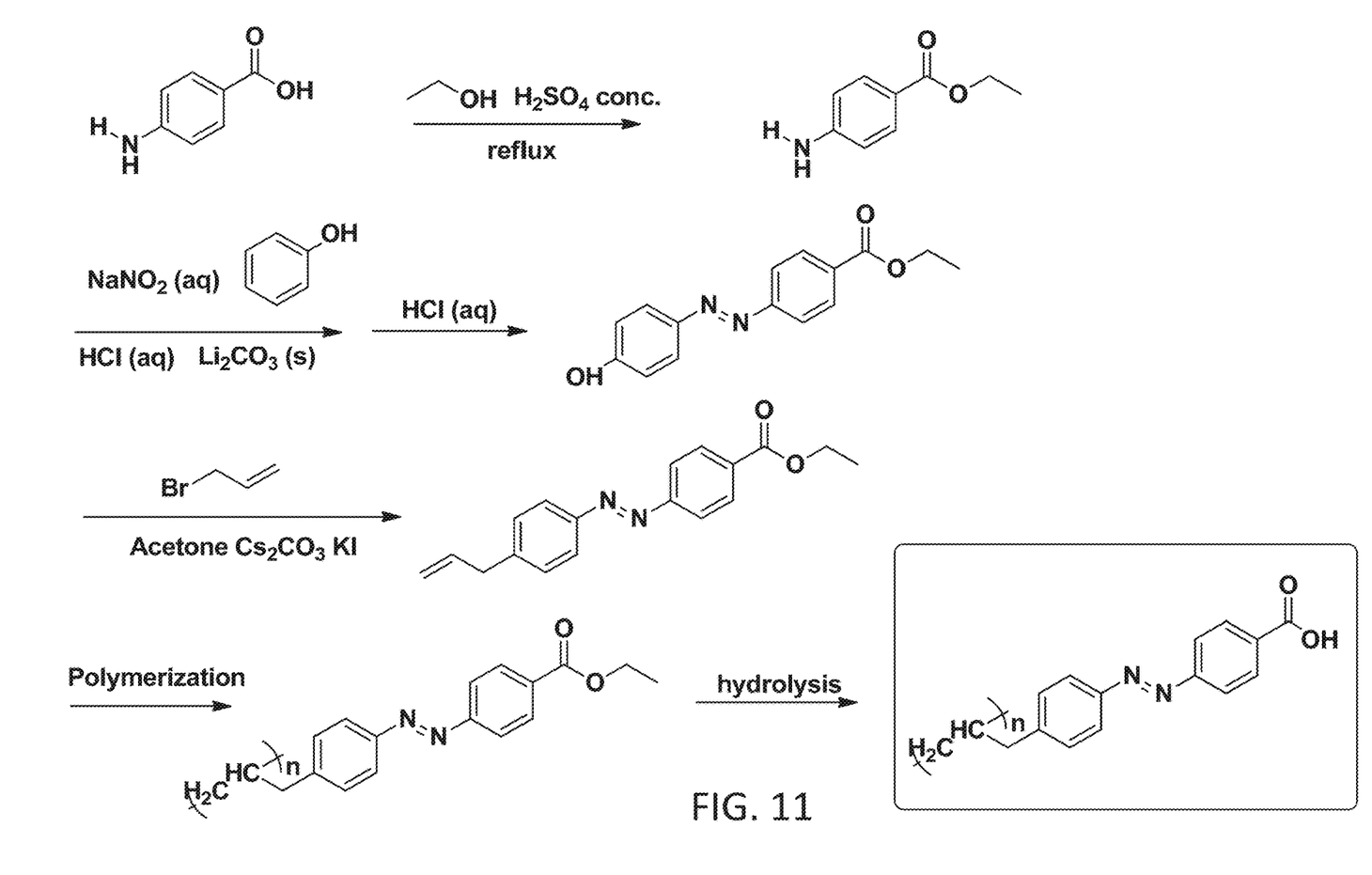
FIG. 11 depicts synthesis of a polymer with light-triggered sorption-desorption properties.
Figure 12:
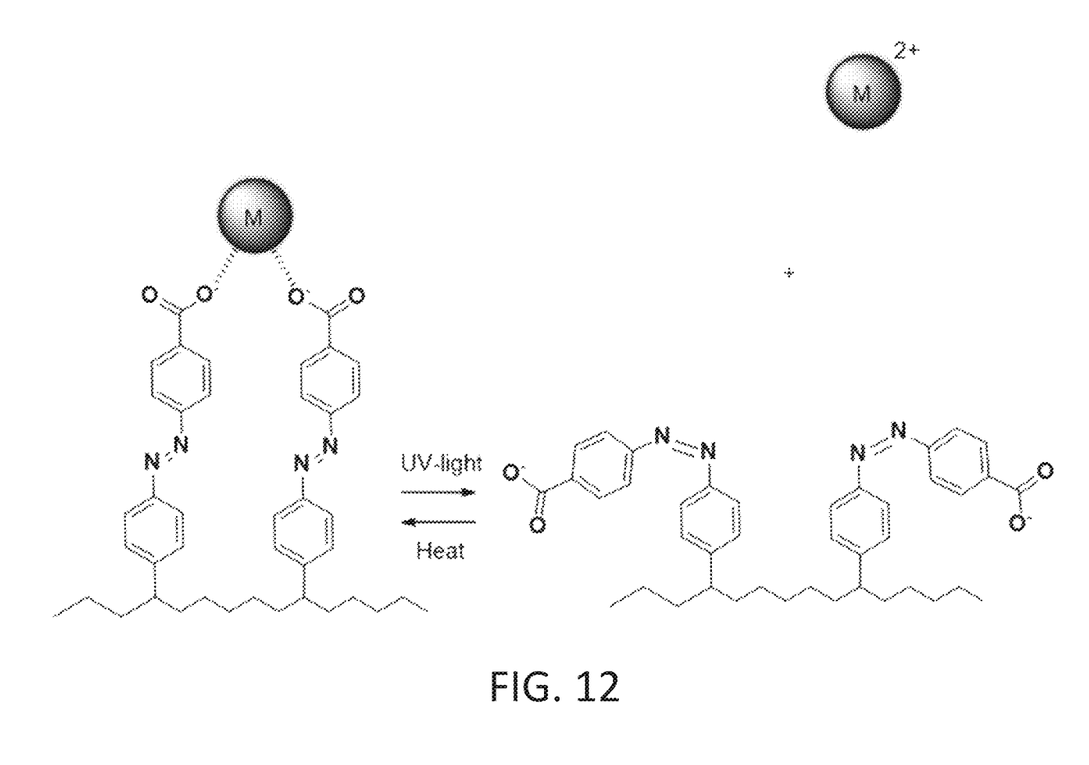
FIG. 12 depicts chelation of a divalent metal ion with the polymer of FIG. 11.

Synthesis of a photoresponsive polymer with light-triggered sorption-desorption properties is shown in FIG. 11. As shown in FIG. 12, the polymer of FIG. 11 chelates divalent metal ions when exposed to heat, and releases the metal ions when exposed to UV light.

Figure 13:
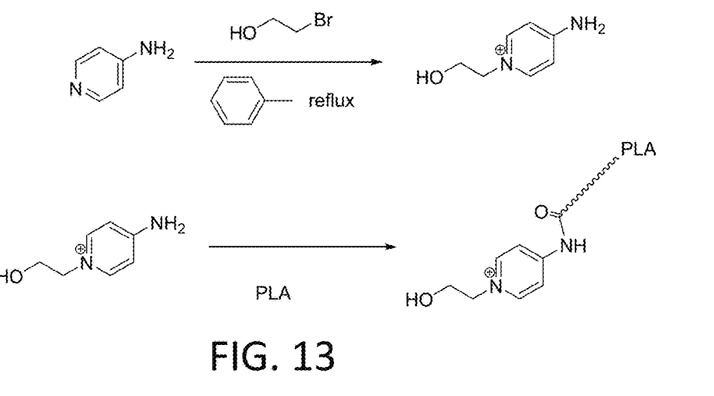
FIG. 13 depicts synthesis of a polymer with light triggered sorption-desorption properties for chelation of anions.
Figure 14:
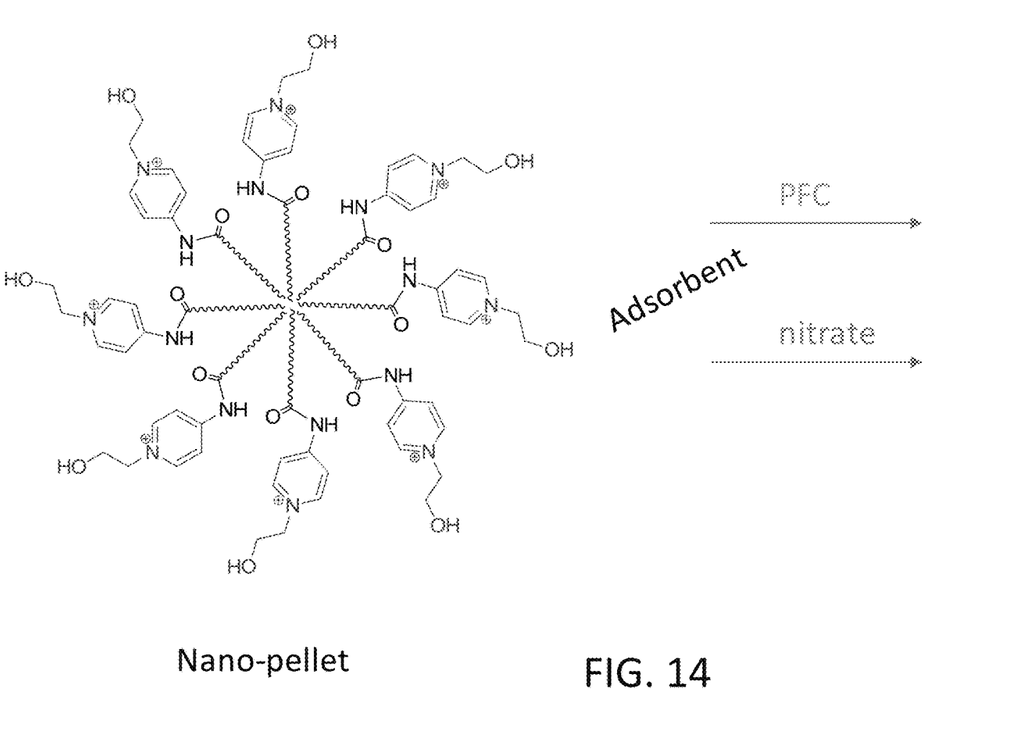
FIG. 14 depicts a nanopellet formed by the polymer of FIG. 13.

FIG. 13 depicts synthesis of photoresponsive polymers that include a photoresponsive a monomer bound to polylactic acid (PLA). FIG. 14 depicts formation of nano-pellets from the photoresponsive polymers of FIG. 13. The nano-pellets are suitable for binding nitrate and perfluorinated compounds (PFCs). F!

Photoresponsive polymers such as those described herein may be used as coatings for optical fibers of the photoreactors and photoreactor systems described herein to remove targeted ions from flowing water. The irradiation (e.g., UV irradiation) will convert the polymer to its alternate (e.g., cis) configuration to strengthen its ionic (e.g., anionic) binding. Once adsorbed, the UV light may be turned off (or visible light is applied) to return these polymers to their initial configuration, with lesser affinity to the ions, where the adsorbed ions are released or flushed out of the system or utilized in recovering ions such as phosphate or arsenic or other targeted ions from bulk water.

Photoresponsive polymers such as those described herein may also be combined with metallic photothermal nanoparticles (NPs) and/or nanostructured carbon materials. These materials facilitate conversion of visible light into localized heat, and can be effective in the degradation of organic pollutants in water. Adding photothermal NPs to the photoresponsive polymers is beneficial, in that organics in water adsorbing to photoresponsive polymers (e.g., due to hydrophobic-hydrophobic interaction) having a negative impact or blocking or minimizing the UV-light exposure may be degraded under visible light (during the desorption process).

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A photoreactor comprising:
   a reservoir configured to hold water, the reservoir defining an inlet and an outlet; and
   a multiplicity of optical fiber assemblies positioned in the reservoir, wherein each optical fiber assembly comprises:
   one or more optical fibers coated with a composition comprising a photoresponsive polymer; and
   a light source optically coupled to the one or more optical fibers;
   wherein the photoresponsive polymer is configured to undergo a change from an initial state to an irradiated state when irradiated with light from the light source, and the photoresponsive polymer in the irradiated state is adapted to bind an ion from the water.

2. The photoreactor of claim 1, wherein the change is a structural change.

3. The photoreactor of claim 2, wherein the structural change comprises isomerization.

4. The photoreactor of claim 1, wherein the change is a change in charge.

5. The photoreactor of claim 4, wherein the photoresponsive polymer is electrically neutral in the initial state and ionized in the irradiated state.

6. The photoreactor of claim 1, wherein the change is a change in dipole moment.

7. The photoreactor of claim 1, wherein the photoresponsive polymer is configured to undergo a change from the irradiated state to the initial state when irradiation with light from the light source is ceased, and the photoresponsive polymer in the initial state is adapted to release the bound ion.

8. The photoreactor of claim 1, wherein the photoresponsive polymer is configured to undergo a change from the irradiated state to the initial state when irradiated with visible light, and the photoresponsive polymer in the initial state is adapted to release the bound ion.

9. The photoreactor of claim 1, wherein the light source is configured to provide ultraviolet light, visible light, infrared light, or any combination thereof to the one or more optical fibers.

10. The photoreactor of claim 1, wherein the light source is configured to provide filtered sunlight to the one or more optical fibers.

11. The photoreactor of claim 1, wherein the light source is polychromatic or monochromatic.

12. The photoreactor of claim 1, wherein the photoresponsive polymer comprises azobenzene or spiropyran.

13. The photoreactor of claim 1, wherein the composition comprises photothermal nanoparticles, nanostructured carbon, or a combination thereof.

14. The photoreactor of claim 1, wherein the photoresponsive polymer in the irradiated state is adapted to bind a divalent cation.

15. The photoreactor of claim 14, wherein the divalent cation comprises calcium or magnesium.

16. The photoreactor of claim 1, wherein the photoresponsive polymer in the irradiated state is adapted to bind an anion.

17. The photoreactor of claim 16, wherein the anion comprises phosphate or arsenate.

18. A photoreactor system comprising:
   a first photoreactor and a second photoreactor, wherein each photoreactor comprises:
      a reservoir configured to hold water, the reservoir defining an inlet and an outlet; and
      a multiplicity of optical fiber assemblies positioned in the reservoir, wherein each optical fiber assembly comprises:
         one or more optical fibers coated with a composition comprising a photoresponsive polymer; and
         a light source optically coupled to the one or more optical fibers;
      wherein the photoresponsive polymer is configured to undergo a change from an initial state to an irradiated state when irradiated with light from the light source, and the photoresponsive polymer in the irradiated state is adapted to bind an ion from the water;
   an inlet conduit fluidly coupled to the first photoreactor and the second photoreactor, wherein the inlet conduit is configured to provide untreated water to the first photoreactor and the second photoreactor; and
   a first outlet conduit and a second outlet conduit fluidly coupled to the first photoreactor and the second photoreactor, wherein the first outlet conduit is configured to remove treated water from the first photoreactor and the second photoreactor, and the second outlet conduit is configured to remove contaminants from the first photoreactor and the second photoreactor.

19. The photoreactor system of claim 18, wherein the first photoreactor and the second photoreactor are configured to operate alternately, such that photoresponsive polymer in the first photoreactor is in the initial state while the photoresponsive polymer in the second photoreactor is in the irradiated state and vice versa.

20. A method of treating water to remove ions, the method comprising:
   providing water to be treated to a photoreactor comprising a light source coupled to an optical fiber, wherein the water comprises ions and the optical fiber is coated with a photoresponsive polymer;
   operating the light source to provide light to the optical fiber, thereby irradiating the photoresponsive polymer such that the photoresponsive polymer undergoes a change from an initial state to an irradiated state;
   binding ions in the water with the photoresponsive polymer in the irradiated state; and
   altering the photoresponsive polymer to release the bound ions, wherein altering the photoresponsive polymer comprises ceasing or altering irradiation with the light source.

* * * * *